US006159615A

United States Patent [19]

Shibatani et al.

[11] Patent Number: 6,159,615

[45] Date of Patent: Dec. 12, 2000

[54] LIQUID ELECTROPHOTOGRAPHIC DEVELOPMENT SHEET

[75] Inventors: Masaya Shibatani; Toyohisa Mouri; Yutaka Hattori, all of Shizuoka, Japan

[73] Assignee: Tokushu Paper Mfg. Co., Ltd., Japan

[21] Appl. No.: 09/416,776

[22] Filed: Oct. 13, 1999

Related U.S. Application Data

[62] Division of application No. 08/835,325, Apr. 7, 1997, Pat. No. 5,998,038.

[30] Foreign Application Priority Data

Apr. 10, 1996 [JP] Japan ........................................ 8-88196

[51] Int. Cl.[7] ........................................ B32B 27/00

[52] U.S. Cl. ........................................ 428/500; 430/117

[58] Field of Search ........................................ 428/500; 430/117

[56] References Cited

U.S. PATENT DOCUMENTS

| | | | |
|---|---|---|---|
| 4,794,651 | 12/1988 | Landa et al. | 430/110 |
| 4,842,974 | 6/1989 | Landa et al. | 430/137 |
| 5,047,307 | 9/1991 | Landa et al. | 430/137 |
| 5,192,638 | 3/1993 | Landa et al. | 430/137 |
| 5,264,313 | 11/1993 | Landa et al. | 430/137 |
| 5,277,965 | 1/1994 | Malhotra | 428/216 |
| 5,294,592 | 3/1994 | Noguchi et al. | 503/227 |
| 5,362,548 | 11/1994 | Hiyoshi et al. | 428/195 |
| 5,407,771 | 4/1995 | Landa et al. | 430/109 |
| 5,554,476 | 9/1996 | Landa et al. | 430/106 |

*Primary Examiner*—Mark Chapman
*Attorney, Agent, or Firm*—Baker & Daniels

[57] ABSTRACT

A liquid electrophotographic development sheet wherein a polyethylene resin or a resin including polyethylene such as a polyethylene ionomer as a main component is present on at least one of the surfaces of a substrate sheet is provided. The development sheet can find wide application such as a newspaper, a magazine, a commercial publication, various publications, a poster, a postcard and an envelope, due to its excellent transfer-fixing property.

1 Claim, 1 Drawing Sheet

LIQUID ELECTROPHOTOGRAPHIC DEVELOPMENT SHEET

This application is a division of application Ser. No. 08/835,325, filed Apr. 7, 1997 (now U.S. Pat. No. 5,998, 038).

BACKGROUND OF THE INVENTION

1. Field of the Invention

The present invention relates to a liquid electrophotographic development sheet, and in particular to a liquid electrophotographic development sheet which has excellent properties of transferring and fixing a toner.

2. Prior Art

Conventionally, as a method of reproducing a large number of copies of information such as characters and pictures, a printing method such as offset or gravure has been well known. According to the conventional printing method, a plate on which information to be recorded has been reproduced is formed, and then information which was represented by the presence of ink or a variable density thereof is reproduced from the plate to a substrate sheet. Since a working process requires very much labor and time, the conventional printing method is not suitable for reproducing various types of information little by little in various combinations, although a much superior method of reproducing a large number of copies of information.

Therefore, an electronic printing method which can be represented by a copying machine has come to the main current as a method of reproducing a small number of copies of information. The electronic printing method is suitable for reproducing a small number of copies of information which is a weak point of the conventional printing method, since there is no necessity of photoengraving. As the electronic printing method, various methods such as a thermal system, an electrophotographic system, a thermal-transferring system and an ink-jet system have been proposed, and a copying machine, a printer, a facsimile telegraph and the like to which such a system is applied are actually coming on to the market in large quantities.

At the present time, with respect to the reproduction of information of a characters and simple illustrations level, it has become very common to use a monochromatic copying machine, while with respect to the printing of an original picture having gradations such as graphics, or an original picture in full color, the conventional printing method is still often used. This is, because the electronic printing method is often inferior in the quality of pictures, cost, speed and the like.

However, recent developments in electronics are remarkable, and thereby, electronic printing technologies also are rapidly developed, and some printing machines have been proposed, which utilize electronic printing methods and can provide a rapid reproduction with pictures of higher quality at a low cost.

Among the electronic printing methods, a dry electrophotographic system is the one which can be represented by a business copying machine and the like, in which a toner for forming pictures is a powdered solid toner which comprises a pigment and a synthetic resin; and the formation of the pictures is carried out by making the toner adsorbed to an electrostatic latent image which was formed on the surface of a photosensitive body by a corona electrical charging, and heating and applying the toner to a development sheet.

This dry electrophotographic system is not good for the environment in the point that the more finely the toner is grained, the more easily the toner can be scattered, and the inhaling the toner is not good for the health. Therefore, a limit is imposed on finely graining the powdered solid toner, which is a obstacle to provide a high definition. In addition, the dry electrophotographic system has many problems. For example, when the thickness of an object to be transcribed is inhomogeneous, the charge density on the surface of the object to be transcribed, which was provided by a corona electrical charging, is dispersed, and consequently, an undesirable image which is generally referred to as "fog" is caused on a record sheet at a non-picture portion. In addition, it is necessary to apply a high temperature so as to fuse the toner.

In the ink-jet system, an image is formed by spattering fine ink-drops onto a development sheet so as to form an image. However, the system inherently involves a problem that, in order to form a color picture, it is necessary to use an aqueous ink which contains a dye staff having a poor light-resistance and water-resistance Moreover, it is necessary to use a special purpose recording-sheet having a high liquid-absorbing ability.

In the thermal system or a thermal transfer system, a special development sheet or an ink ribbon needs to be used, and therefore, it is important to get free of incurring a high cost.

Accordingly, in due consideration of satisfying conditions such as a high-quality picture, a high speed and a low cost, the liquid electrophotographic system is one of the most promising system among various electronic printing systems at present.

That is, in the liquid electrophotographic system, since the toner can be more fine as compared with that used in a dry electrophotographic system, and since a pigment can be used as a color material, there is no problem in light-resistance and water-resistance.

Next, a printing machine for the liquid electrophotographic system will be explained. The liquid electrophotographic system has been investigated from a fairly long time ago, and some machines have been put to practical use. However, such machines were not popularized, since problems in a solvent smell, the ability thereof to transfer to a base or substrate sheet and the like had arisen. However, recently, as a machine in which the various defects as mentioned above has been removed, for example, a digital printing machine such as the registered trademark "E-PRINT" made by INDIGO Corp. has been provided.

Such a digital printing machine will be explained with reference to FIG. 1. The digital printing machine, which is similar to a normal offset printing machine in the construction, has three cylinders, i.e., a drum 1, a blanket cylinder 2 and an impression cylinder 3. The drum 1 comprises a photoconductor, and the blanket cylinder 2 is constituted to be heated in order to form a fused film from a liquid toner.

First, the drum 1, which was charged by a corona electrical charging, is exposed by a light beam in a dark place so as to form a latent image. Since the exposure is carried out by a laser light source according to a bit-map information from a computer, no physical preparation is necessary to form a latent image. Therefore, as compared with the conventional offset printing, the advantageous effect is provided that it is possible to print a different information for every number of each sheets to be printed, and no complicated process for plate-making is necessary, and furthermore, no expense for plate-making is incurred.

A latent image having an electric charge formed on the drum 1 is supplied with a liquid toner which was made to carry the contrary electric charge from an injector 4 and adsorbs the toner to form an ink picture by the toner. Thereafter, the ink picture is supplied from the drum 1 to the blanket cylinder 2 by static electricity. The ink picture is heated to be fused so as to form a film on the blanket cylinder 2. Lastly, the impression cylinder 3 is used to transfer the film-shaped picture to an article to be transferred by pressure so as to form an objective picture. In a full color printing, the steps mentioned above are repeated four times, while each of liquid toners of yellow, cyan blue, magenta and black is used.

Thus, a digital printing machine to which the liquid electrophotographic system is applied is a new printing machine having an excellent advantageous effect. However, in order to provide the maximum of the characteristics thereof, a particular property is demanded for a development sheet to be used. Namely, there is a problem that when a printing sheet which has been used as a development sheet in the conventional printing method was used, the transferring property of a toner to the development sheet is not satisfactory, because the adhesion between the toner and the surface of the development sheet is weak. Moreover, even if the toner is transferred, the toner will be easily peeled by an external force such as a frictional force or a scratch.

Therefore, it is an object of the present invention to provide a liquid electrophotographic development sheet which is excellent in the transferring and fixing properties of a toner, and can be put to practical use.

SUMMARY OF THE INVENTION

The present inventors have earnestly investigated so as to solve the above-mentioned problems. Consequently, it has been found that when a polyethylene resin or a resin including polyethylene as a main component exists on the surface of a development sheet on which a toner is transferred, a remarkably advantageous effect can be provided in the transferring and fixing properties of the toner; and a polyethylene resin, a resin including polyethylene as a main component and having metal-ionic bonds among polymer chains, which is hereinafter referred to as "polyethylene ionomer", and an ethylene-vinyl acetate resin are particularly excellent in the effect among others, which had led the present invention into completion. Furthermore, it has been found that a polyethylene ionomer is most effective among the resins.

According to the present invention, a liquid electrophotographic development sheet, characterized in that a polyethylene resin or a resin including polyethylene as a main component exists on at least one side of the surfaces of a substrate sheet can be provided.

In the liquid electrophotographic development sheet of the present invention, since the surface of a substrate sheet is provided with a polyethylene resin or a resin including polyethylene as a main component, the development sheet is excellent in the transferring and fixing properties of the toner, and therefore, can find wide application such as a newspaper, a magazine, a commercial publication, various publications, a poster, a postcard and an envelope.

DETAILED DESCRIPTION OF THE INVENTION

Figure 1:
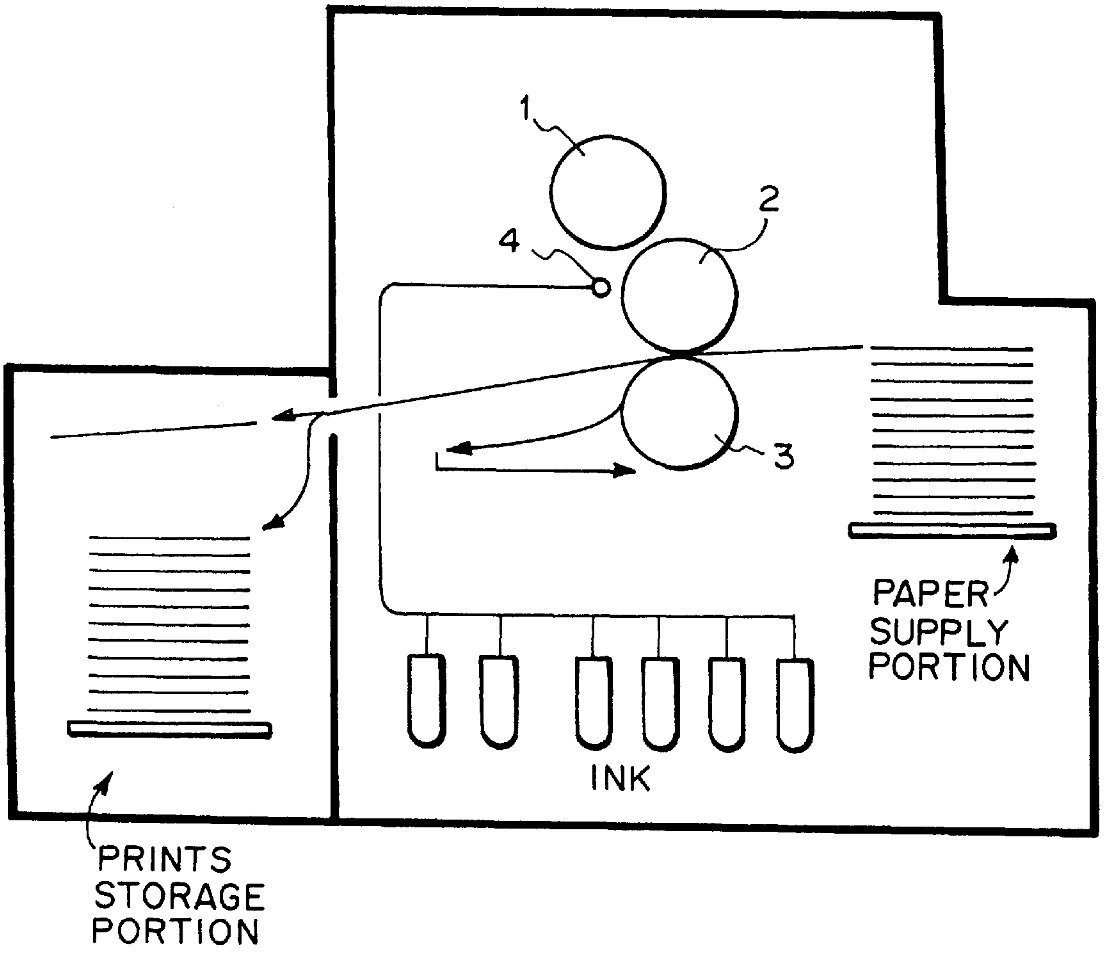
FIG. 1 is a schematic side view illustrating the principle of the liquid electrophotographic system to which a development sheet of the present invention can be applied.

A liquid electrophotographic development sheet of the present invention is applied to a digital printing machine by the liquid electrophotographic system as explained above and illustrated in FIG. 1.

A polyethylene resin or the resin including polyethylene as a main component as mentioned above will do well, so long as the resin exists on the surface of the development sheet, and is not restricted in the morphology in which the resin is supported on the substrate sheet, or in the manner of supporting the resin. For example, only the resin may be applied to the surface of the substrate sheet; the resin may be mixed with other materials so as to apply to the substrate sheet; or the resin may be impregnated into the substrate sheet or may be previously added thereto.

When the polyethylene resin or the resin including polyethylene as a main component is applied to the surface of the substrate sheet, the application in an amount of only 0.01 $g/m^2$ of solids can provide the advantageous effect, from which it is found that the resin will do well, so long as the resin exists on the surface of the substrate sheet in a very small amount, even when any processing manners were used.

Furthermore, so long as the substrate sheet can support the polyethylene resin or the resin including polyethylene as a main component on the surface thereof, substantially all kinds of sheets can be used for the development sheet of the invention, and the transferring and fixing properties of the toner is not subject to the influence of the material of a substrate sheet used. For example, a paper sheet, a film, a nonwoven fabric cloth or the like which is a common recording material, wherein the term "paper" is used in this specification to mean a sheet article which is made of wood cellulose which is beat to the desired degree by using a publicly known beating machine, a nonwood cellulose, a filler and various chemicals by using a publicly known paper machine such as Fourdrinier paper machine, a cylinder paper machine, an inclined-type paper machine; as well as a coated paper with a coating material comprising a filler and chemicals, for example, art paper, coated paper, paper board and the like. Further, the term "film" means a sheet article which was made of an organic resin such as viscose, acetate, polyethylene, polypropylene, poly(vinyl chloride), polystyrene, nylon, polycarbonate, poly(ethylene terephthalate) or poly(butylene terephthalate), which may be mixed with one or more kinds of filler and chemical as occasion demands, by applying a publicly known process such as an extrusion process, a calendaring process or a drawing process. Furthermore, the term "nonwoven fabric cloth" means a sheet article which was made from a fiber material such as a wood cellulose, cotton, rayon, poly (ethylene terephthalate), poly(butylene terephthalate), polyacrylonitrile or polypropylene by applying a publicly known process such as a span bond process or a paper process.

The specific examples of the present invention will now be described.

EXAMPLE 1

20 parts by weight of breached needle-leaf tree Kraft pulp (NBKP) and 80 parts by weight of breached broad leaf tree Kraft pulp (LBKP) were beat with 550 ml of C.S.F. Then, to the beat pulp mixture were added 10 parts by weight of clay, 0.3 part by weight of paper strength agent (registered trademark "Polystron 191" made by Arakawa Chemical Industries, Ltd.), 2 parts by weight of sizing agent (registered trademark "Sizepine" made by Arakawa Chemical Industries, Ltd.) and 2 parts by weight of Alum to form a stock. Thereafter, a substrate sheet having a basis weight of 150 $g/m^2$ was prepared from the stock according to the usual way using the Fourdrinier paper machine.

An aqueous dispersion of a polyethylene resin (registered trademark "Chemipearl M-200" made by Mitsui Petrochemical Industries, Ltd.) was applied to the substrate sheet by using an air knife coater so that the application in an amount of 0.05 g/$m^2$ of solids is provided, thereby to obtain a liquid electrophotographic development sheet.

EXAMPLE 2

An aqueous dispersion of a polyethylene ionomer resin (registered trademark "Chemipearl S-120" made by Mitsui Petrochemical Industries, Ltd.) was applied to the same substrate sheet as the one used in Working Example 1 by using an air knife coater so that the application in an amount of 0.05 g/$m^2$ of solids is provided, so as to obtain a liquid electrophotographic development sheet.

EXAMPLE 3

An aqueous dispersion of an ethylene-vinyl acetate copolymer resin (registered trademark "Sumikaflex 401" made by Sumitomo Chemical Co., Ltd.) was applied to the same substrate sheet as the one used in Working Example 1 by using an air knife coater so that the application in an amount of 0.05 g/$m^2$ of solids is provided, so as to obtain a liquid electrophotographic development sheet.

COMPARATIVE EXAMPLE 1

The same operation as the one in Working Example 1 was carried out except that the same substrate sheet as the one used in Working Example 1 was used as it is, so as to provide a liquid electrophotographic development sheet.

The transferring and fixing properties of samples of liquid electrophotographic development sheets which were obtained in Working Examples and Comparative Example mentioned above was estimated according to the following estimation method.

The method of estimating is the estimation of the transferring and fixing properties according to organoleptic tests, which is given by the total marks through four tests comprising a test of transferring, a test of peeling a cellophane tape, a test of rubbing with an eraser and a test of scratching with a nail; each of the four tests giving a mark on the maximum of 4 marks; and all of the four tests giving marks on the maximum of 16 marks. In the estimation, the registered trademark "E-PRINT" made by INDIGO Corp. was printed on each of the samples so as to estimate the printed matters thereof.

The test of transferring is a test which comprises solid-printing toners of four colors of cyan blue, magenta, yellow and black, respectively, and thereafter, confirming with the naked eye whether each of the toners has been properly transferred on a development sheet. The criterion of each of estimated marks is as follows:

Mark 4: such a state that all of the four colors are clearly printed;

Mark 3: such a state that the ratio of the area of inferior transferred portion to the total printed area is 5% or less;

Mark 2: such a state that the ratio of the area of inferior transferred portion to the total printed area is larger than 5% and 10% or less;

Mark 1: such a state that the ratio of the area of inferior transferred portion to the total printed area is larger than 0% and smaller than 15%; and Mark 0: such a state that the ratio of the area of inferior transferred portion to the total printed area is larger than 15%.

The test of peeling a cellophane tape is a test which comprises sticking a cellophane adhesive tape (registered trademark "Cellotape" made by Nichiban Corp. was used) on a solid-printing portion in the four colors by once going and returning a rubber roll weighing 5 kg, and then, peeling the tape after one hour so as to estimate with the naked eye the degree of peeling of the toner. The criterion of each of estimated marks is as follows:

Mark 4: such a state that none of the toners in the four colors are peeled from the printed surface;

Mark 3: such a state that the ratio of a peeled area to the total printed area is 5% or less;

Mark 2: such a state that the ratio of a peeled area to the total printed area is larger than 5% and 10% or less;

Mark 1: such a state that the ratio of a peeled area to the total printed area is larger than 10% and smaller than 15%; and Mark 0: such a state that the ratio of a peeled area to the total printed area is 15% or more.

The test of rubbing with an eraser is a test which comprises rubbing a printed surface with a plastic eraser (trade name "MONO" made by Tombow Pencil Corp.) by rubbing five times, and estimating with the naked eye the degree of the rubbed toner. The criterion of each of estimated marks is as follows:

Mark 4: such a state that none of the four colors are rubbed;

Mark 3: such a state that the ratio of a rubbed area to the total printed area is 5% or less;

Mark 2: such a state that the ratio of a rubbed area to the total printed area is larger than 5% and 10% or less;

Mark 1: such a state that the ratio of a rubbed area to the total printed area is larger than 10% and smaller than 15%; and Mark 0: such a state that the ratio of a rubbed area to the total printed area is 15% or more.

The test of scratching with a nail is a test which comprises scratching a printed surface with a nail, and estimating with the naked eye the degree of the scratch. The criterion of each of estimated points is as follows:

Mark 4: such a state that none of the toners of the four colors are removed by scratching;

Mark 3: such a state that one of the four colors is removed;

Mark 2: such a state that two of the four colors are removed;

Mark 1: such a state that three of the four colors are removed; and

Mark 0: such a state that all of the four colors are removed.

The estimation of the transferring and fixing properties according to the organoleptic test is what was provided by a mark between the maximum of 16 marks and the minimum of 0 mark as a result of making a total of each mark estimated through the four tests. Actions such as sticking a cellophane adhesive tape, removing with a nail, and rubbing with an eraser are supposed to be an external force which a printed matter may be subjected to. Therefore, the estimation is fitted for estimating whether the transferring and fixing properties of a toner is practical or not. Namely, when the above-mentioned estimation is 16 marks, the transferring and fixing properties thereof is perfect. Furthermore, when the same test was carried out for a printed matter by an offset printing, the estimation is between 12 marks to 14 marks. Therefore, a printed matter having the estimation between 12 marks to 16 marks can be estimated to have the same fixing property as that of the usual printed matter. Furthermore, when the above marks are between 8 to 11, the transferring property is nearly perfect. However, the fixing properties somewhat inferior to that of an offset printing. When the above estimation is 8 marks or less, the transferring property is poor, which does not satisfy even the minimum of a level for the reproduction of information, and is not practical.

The estimation of the transferring and fixing properties according to the organoleptic tests in Working Examples 1 to 3 and Comparative Example 1 is shown in the following table.

TABLE 1

| Examples | Resin Applied | Transfer | Cellophane Tape | Nail | Eraser | Total Marks |
|---|---|---|---|---|---|---|
| Example 1 | Polyethylene | 4 | 4 | 3 | 3 | 14 |
| Example 2 | Polyethylene Ionomer | 4 | 4 | 4 | 4 | 16 |
| Example 3 | Ethylene-Vinyl Acetate | 4 | 3 | 3 | 4 | 14 |
| Comparative Example 1 | — | 1 | 0 | 0 | 0 | 1 |

As can be seen clearly from Table 1, the existence in a very small amount of a polyethylene resin or a resin including polyethylene as a main component such as a polyethylene resin, a polyethylene ionomer or an ethylene-vinyl acetate copolymer on the surface of a substrate sheet can sharply improve the transferring and fixing properties of a toner.

Furthermore, among others, a polyethylene ionomer can provide a particularly excellent effect.

What is claimed is:

1. A liquid electrophotographic development sheet for a liquid electrophotographic system comprising forming a latent image on a photoconductive drum with a laser light source, developing the latent image with a liquid toner, transferring the liquid toner image to a blanket drum, turning the liquid toner image on the blanket drum into a film by heating and transferring the film-shaped toner images to a recording sheet by pressure by means of an impression drum, wherein said recording sheet comprises: a substrate sheet and a resin layer applied to at least one surface of said substrate sheet, said resin layer including an ethylene-vinyl acetate copolymer.

* * * * *